Sept. 24, 1968     M. E. TILLANDER ET AL     3,402,683
DISCONTINUOUS BAKING OVEN
Filed Dec. 7, 1966     2 Sheets-Sheet 1
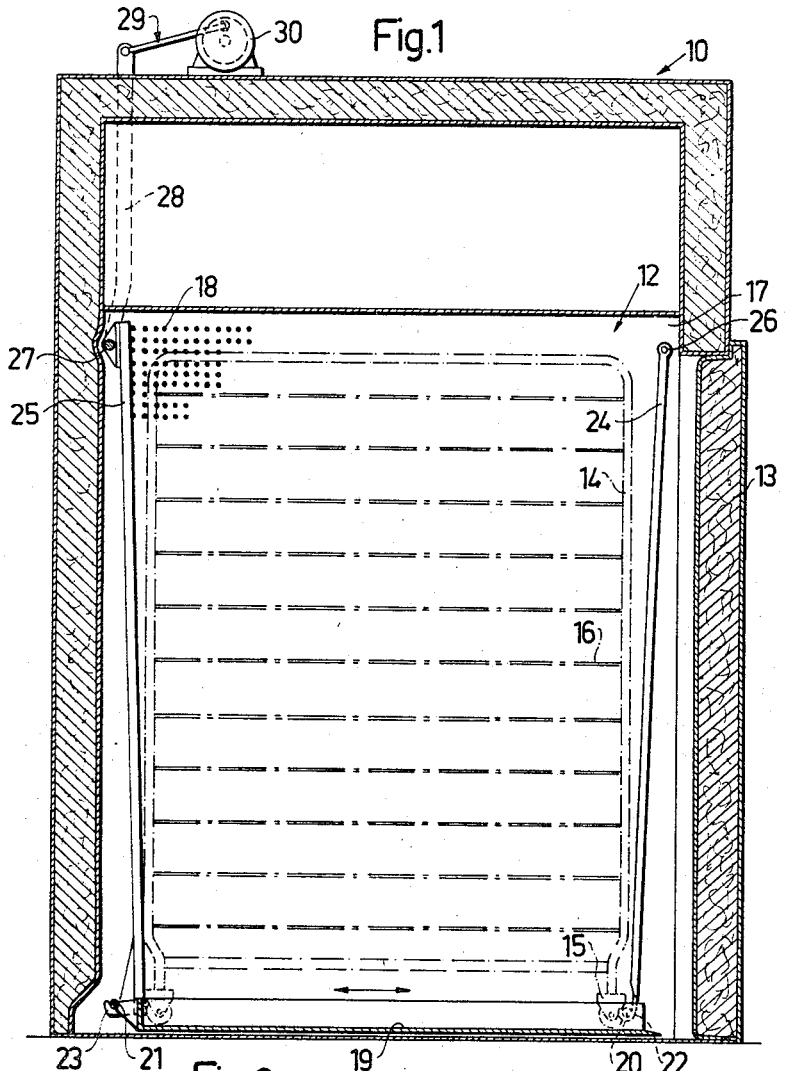
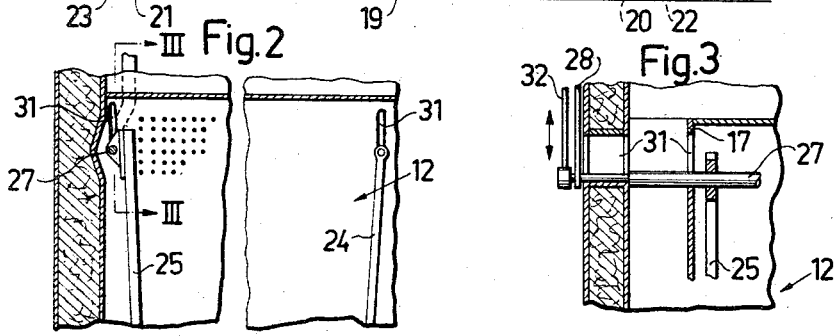
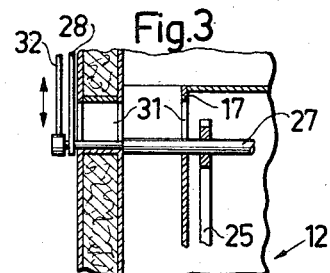
INVENTORS
MAGNUS EMANUEL TILLANDER
AKE BERNHARD PERSSON
LEIF ARVE TORE JOHANNSSON
BY M. G. Leward Toren
ATTORNEY Sept. 24, 1968    M. E. TILLANDER ET AL    3,402,683
DISCONTINUOUS BAKING OVEN
Filed Dec. 7, 1966    2 Sheets-Sheet 2

INVENTORS
MAGNUS EMANUEL TILLANDER
AKE BERNHARD PERSSON
LEIF ARVE TORE JOHANNSSON

BY M. Gleward Toren
ATTORNEY 3,402,683
DISCONTINUOUS BAKING OVEN
Magnus E. Tillander and Åke B. Persson, Vällingby, and Leif A. T. Johansson, Huddinge, Sweden, assignors to Ti-Pe Elmeko, Tillander & Persson
Filed Dec. 7, 1966, Ser. No. 599,785
Claims priority, application Sweden, Dec. 10, 1965, 16,020/65
9 Claims. (Cl. 107—55)

ABSTRACT OF THE DISCLOSURE

A discontinuous baking oven of the kind having a parallelepipedal baking chamber through which heated air is moved horizontally to touch dough pieces carried on superposed baking plates in a rack. The oven is provided with means for continuously reciprocating the rack in a vertical plane whereby the effects of an ununiform heat distribution in the baking chamber are reduced or eliminated. The rack is carried by a horizontal platform which is parallel to the floor of the baking chamber and suspended by pendulating levers to be reciprocated horizontally. According to another embodiment a similar platform is provided which is supported and guided laterally by rolling bodies, such as balls.

---

This invention relates to rack-type convection baking ovens, that is discontinuous baking ovens having a substantially parallelepipedal baking chamber through which in operation heated air is forced to touch dough pieces carried on superposed baking plates in a rack.

In conventional rack-type convection baking ovens the rack is stationary during the baking and, therefore, it is necessary to provide for an extremely uniform heat distribution in the oven to achieve a uniform baking. In travelling ovens the heat distribution is not critical to the same extent, as in such ovens the dough pieces are continuously moved from one end of an elongated baking chamber to the other. By suitable expedients, such as, for example, periodic reversing of the air flow through the baking chamber and careful dimensioning and designing of the air ducts and the air distributing means, it is possible to achieve a heat distribution that is sufficiently uniform for most kinds of bread.

Thus, the sidewalls of the baking chamber may each consist of two flat, perforated plates engaging each other face to face and being relatively displaceable in such a manner to bring the perforations in one plate at least into partial register with the perforations in the other plate to vary the size of the resulting flow openings. However, the displacing of the plates must be carried out with extreme accuracy, especially when the oven is to be used for the baking of certain kinds of bread difficult to bake, so called hot dog bread, for example.

It is known to rotate the rack during the baking to eliminate or at least reduce the effects of an ununiform heat distribution in the baking chamber. Ovens having a rotating rack are, however, suitable only for racks the length and width of which are comparatively small and fairly alike. A wide rack requires a wide door opening of the baking chamber which is disadvantageous, and if the length and width of the rack are not fairly alike, that is if the rack is not substantially square in plan view, the horizontal dimensions of the baking chamber must be large compared to those of the rack as the width and length of the baking chamber must be at least as large as the horizontal diagonal of the rack.

The object of this invention is to provide a new and improved baking oven of the class described, wherein a uniform baking is achieved without the necessity of providing for an extremely uniform heat distribution in the baking chamber.

According to the invention we provide in a baking oven of the class described means for continuously reciprocating the rack in a plane normal to the direction of the air flow through the baking chamber. It has been found that in an oven wherein provisions (consisting in, for example, means for periodic reversing of the air flow and uniformly perforated sidewalls of the baking chamber) are made for achieving a fairly uniform heat distribution, it is sufficient to reciprocate the rack six to twelve inches, independently of the dimension of the rack in the plane of reciprocation. Accordingly, the extra volume of the baking chamber required for the reciprocation of the rack is independent of the length of the rack. Hence it follows that the longer the rack is the more economically the volume of the baking chamber is utilized, but not even for short racks is the extra volume required for the reciprocation significant.

Naturally, horizontal reciprocation of the rack is least power consuming, but the rack might as well be reciprocated vertically or vertically and horizontally, that is moved in a circular path in a vertical plane. Moving the rack in a circular path is advantageous in that an equalizing of the effects of a heat distribution that is ununiform both horizontally and vertically is then achieved.

Generally, the racks are provided with casters, and when the rack is reciprocated horizontally only, it would therefore be possible to have the rack standing directly on the floor of the baking chamber. However, it has shown to be difficult to guide the rack properly if it is standing directly on the floor. For that reason it is preferred to provide the oven with a support which supports the rack and is continuously reciprocated during the baking. The support may be a rectangular platform which is slightly spaced above and parallel to the floor of the baking chamber and suspended from four pendulum levers adjacent its corners. The pendulum levers are pivoted at their upper ends and connected to a drive imparting a pendulating motion to the levers. Alternatively, the platform may be supported and guided laterally by rolling bodies, such as balls. Thus, the support may be provided with guide surfaces adapted to engage over the upper portion of balls which are guided laterally in stationary parallel guide rails.

By way of example only, two embodiments of the invention and modification thereof will now be described in more detail with reference to the accompanying drawings.

FIGURE 1 is a diagrammatic sectional view of one embodiment of a rack baking oven according to the invention, the plane of section being vertical and in the plane of reciprocation of the rack.

FIGURE 2 is a fractional sectional view corresponding to FIGURE 1 and illustrates a modification of the embodiment shown in FIGURE 1.

FIGURE 3 is a fractional sectional view taken on line III—III in FIGURE 2.

Figure 4:
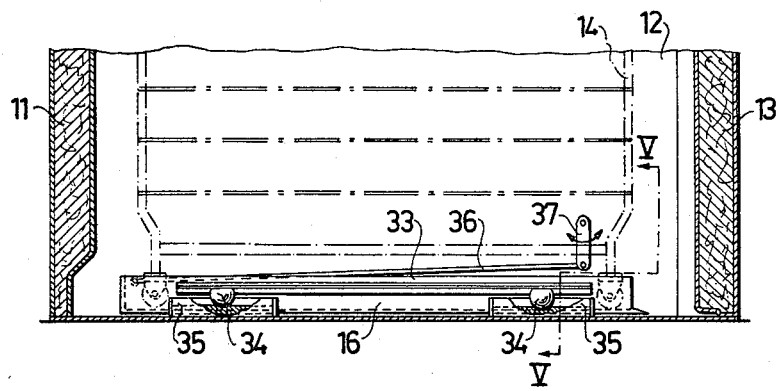
FIGURE 4 is a fractional view, similar to FIGURE 1, of another embodiment.

The baking oven shown in FIGURE 1 of the drawing is generally denoted 10 and comprises a heat insulating casing 11 surrounding a substantially parallelepipedal baking chamber 12 having a door 13 through which a rack 14 (shown in phantom lines) is inserted in and withdrawn from the baking chamber 12. In the rack 14 (shown in phantom lines), which is provided with casters 15, a number of baking plates or trays 16 carrying the dough pieces (not shown) are superposed. Heated air is forced horizontally through baking chamber 12 from one sidewall 17 thereof to the other (the sidewalls are uniformly perforated as indicated at 18) to touch the dough pieces on the baking plates 16 in the rack 14. The space above the baking chamber 12 houses apparatus (not shown) for periodic reversing of the flow of air and also a fan moving the air in a closed path which includes the baking chamber.

The rack 14 is supported by a rectangular platform 19 which by means of front and rear transverse studs 20 and 21, respectively, is engaged in upwardly open hooks or recesses 22 and 23, respectively. The hooks 22 and 23 are each provided on the lower ends of substantially vertical pendulum levers 24 and 25, respectively. In the drawings only two hooks and pendulum levers are shown but it will be appreciated that a hook and a pendulum lever are provided for each corner of the platform 19.

Adjacent their upper ends the pendulum levers 24 and 25 are pivoted on transverse rods 26 and 27, respectively. Adjacent the rod 26 a substantially vertical rocking lever 28 has its lower end connected to the rear rod 27. The rocking lever 28 has its upper end connected to a crank mechanism 29 driven by a geared motor 30. The crank mechanism 29 and the geared motor 30 are adapted to reciprocate the lower ends of the pendulum levers 24 and 25 and, accordingly, the platform 19 and the rack 14, six to eight inches once or twice per minute.

As the length of the pendulum levers 24 and 25 (60 to 75 inches) is large compared to the distance the platform 19 is reciprocated, the platform will always be substantially parallel to the floor of the baking chamber 12 during the reciprocation. Hence it can be supported very close to the floor. The rack 14 can, therefore, be inserted in the baking chamber 12 with little effort. If the pendulum levers 24 and 25 are arranged to be inclined outwardly and upwardly when the platform 19 is in its middle position as shown, and the drive is arranged to stop the platform in the foremost position thereof when the rack is to be inserted or withdrawn, the insertion and withdrawal of the rack is facilitated still more, as the forward end of the platform then is in its lowest position. As the studs 20 and 21 of the platform 19 are freely engaged in the hooks 22 and 23, respectively, the platform can be swung upwardly about the rear studs so as to facilitate cleaning of the floor. Furthermore, the platform can be readily removed from the baking chamber.

In the modification shown in FIGURES 2 and 3, the sidewalls of casing 11 and the baking chamber 12 are provided with vertical slots 31 through which the ends of the transverse rods 26 and 27 extend. The extending ends of the rods 26 and 27 are connected to lifting rods 32 and a drive (not shown) for vertically reciprocating the rods 26 and 27, accordingly, the pendulum levers 24 and 25 simultaneously with the angular reciprocation of the rods by the rocking lever 28. As a result, the rack is moved in a circular path in the vertical plane.

Figure 5:
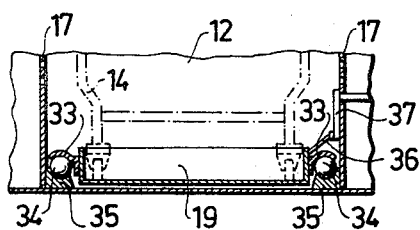
FIGURE 5 is a cross-sectional view, taken on line V—V in FIGURE 4.

In the embodiment shown in FIGURES 4 and 5 the support platform 19 is provided with guides 33 engaging over the upper portion of balls 34 disposed in longitudinal grooves in stationary parallel guide rails 35 on the floor of the baking chamber 12. The guide rails 35 thus cooperate with the guides 33 and the balls 34 to constrain the platform 19 for rectilinear horizontal movement.

A connecting rod 36 connects the platform 19 to a lever 37 which is rocked by a drive not shown. As the lever 37 is rocked the platform 19 and the rack 14 carried thereby are reciprocated horizontally in a rectilinear path on the balls 34.

Figure 6:
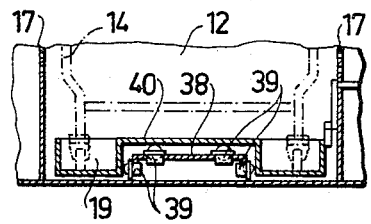
FIGURE 6 is a cross-sectional view, similar to FIGURE 5 and illustrating a modification of the embodiment shown in FIGURES 4 and 5.

The modified embodiment shown in FIGURE 6 differs from the embodiment of FIGURES 4 and 5 in that the floor of the baking chamber 12 is provided with a central ridge 38 having a horizontal upper surface and vertical sides. The upper surface and the sides of the ridge 38 are provided with bearing elements 39 of the kind having a ball which is universally rotatable in a socket. The platform 19 is provided with a similar ridge 40. The surfaces of the ridge 40 facing the ridge 38 engage the balls of the bearing elements 39.

It will be appreciated that scope of the invention is not limited to the embodiments shown and described. Thus, in the embodiment shown in FIGURES 4 and 5 the balls 34 can be replaced by grooved rollers engaging over ribs on the guides 33 and 35 and in the embodiment shown in FIGURE 6 the bearing elements may be provided on the ridge 40 of the platform 19. Moreover, the bearing elements 39 may be replaced by so called linear ball or roller bearings.

What we claim is:
1. In a discontinuous baking oven having a substantially parallelepipedal baking chamber, through which in operation heated air is forced to flow substantially horizontally between two opposed side walls, having perforations therein, to touch dough pieces carried on superposed baking plates in a rack, means for continuously reciprocating the rack in a plane normal to the direction of air flow.

2. A baking oven as claimed in claim 1 wherein a support is disposed adjacent the floor of the baking chamber and arranged to support the rack and to be continuously reciprocated.

3. A baking oven as claimed in claim 2 wherein the support is connected to the lower ends of at least substantially vertical levers which are pivoted at their upper ends, at least one of the levers being connected to a drive for imparting to all of the levers a pendulating motion about their upper ends.

4. A baking oven as claimed in claim 3 wherein a lever is associated with each corner of the baking chamber and wherein the support is a flat, substantially rectangular platform which adjacent each of its corners is engaged in an upwardly open recess adjacent to the lower ends of the respective levers.

5. A baking oven as claimed in claim 1 wherein the said means are arranged to reciprocate the rack vertically in a linear path.

6. A baking oven as claimed in claim 1 wherein the said means are arranged to reciprocate the rack vertically and horizontally.

7. A baking oven as claimed in claim 1 wherein a support for the rack is arranged to be continuously reciprocated and to be supported and guided laterally by rolling bodies such as balls.

8. A baking oven as claimed in claim 7 wherein the support is provided with guide surfaces adapted to engage over the upper portion of the rolling bodies, the rolling bodies being guided laterally in stationary parallel guide rails.

9. A baking oven as claimed in claim 7 wherein bearing elements of the kind comprising a ball which is universally rotatable in a socket are disposed between facing horizontal and vertical surfaces on the support and the floor of the baking chamber.

References Cited

FOREIGN PATENTS 805,468  12/1958  Great Britain.

WALTER A. SCHEEL, *Primary Examiner.*

J. SHEA, *Assistant Examiner.*